(12) United States Patent
Shapiro

(10) Patent No.: US 8,091,916 B2
(45) Date of Patent: Jan. 10, 2012

(54) FOLD FLAT CARRIER WAGON/CART WITH STOWABLE WALLS, WHEELS AND HANDLE, AND MANUFACTURING METHODS

(76) Inventor: Richard N. Shapiro, Va. Beach, VA (US)

( * ) Notice: Subject to any disclaimer, the term of this patent is extended or adjusted under 35 U.S.C. 154(b) by 617 days.

(21) Appl. No.: 12/284,342

(22) Filed: Sep. 22, 2008

(65) Prior Publication Data

US 2010/0072730 A1   Mar. 25, 2010

(51) Int. Cl.
*B62B 11/00* (2006.01)

(52) U.S. Cl. .......... 280/644; 280/47.34; 280/87.05; 280/47.18; 280/648

(58) Field of Classification Search .......... 280/827, 280/1.23, 828, 7.1, 7.15, 647, 648, 650, 651, 280/655–658, 87.01, 87.021, 87.05, 47.18, 280/47.25, 47.38, 47.4
See application file for complete search history.

(56) References Cited

U.S. PATENT DOCUMENTS

| | | | | |
|---|---|---|---|---|
| 2,802,672 | A * | 8/1957 | D Angelo | 280/40 |
| 4,316,615 | A * | 2/1982 | Willette | 280/47.26 |
| 4,765,643 | A * | 8/1988 | Pappanikolaou | 280/639 |
| 4,856,810 | A * | 8/1989 | Smith | 280/639 |
| 4,887,836 | A * | 12/1989 | Simjian | 280/651 |
| 6,220,611 | B1 * | 4/2001 | Shapiro | 280/47.34 |
| 6,581,945 | B1 * | 6/2003 | Shapiro | 280/30 |
| 6,607,207 | B2 * | 8/2003 | Shapiro et al. | 280/287 |
| 6,729,647 | B2 * | 5/2004 | Shapiro et al. | 280/775 |
| 6,733,026 | B1 * | 5/2004 | Robberson et al. | 280/415.1 |
| 6,845,991 | B1 * | 1/2005 | Ritucci et al. | 280/30 |
| 6,893,030 | B2 * | 5/2005 | Shapiro | 280/47.34 |
| 6,916,028 | B2 * | 7/2005 | Shapiro | 280/47.34 |
| 7,066,485 | B2 * | 6/2006 | Shapiro | 280/651 |
| 7,100,929 | B2 * | 9/2006 | Shapiro et al. | 280/282 |
| 7,264,265 | B2 * | 9/2007 | Shapiro | 280/643 |
| 7,819,408 | B2 * | 10/2010 | Shapiro | 280/47.315 |
| 2002/0163164 | A1 * | 11/2002 | Shapiro et al. | 280/651 |
| 2003/0085552 | A1 * | 5/2003 | Shapiro | 280/646 |
| 2003/0205881 | A1 * | 11/2003 | Shapiro et al. | 280/200 |
| 2005/0012307 | A1 * | 1/2005 | Shapiro | 280/651 |
| 2005/0173894 | A1 * | 8/2005 | Shapiro | 280/643 |
| 2009/0039217 | A1 * | 2/2009 | Shapiro | 248/188.6 |

\* cited by examiner

*Primary Examiner* — J. Allen Shriver, II
*Assistant Examiner* — James Triggs

(57) ABSTRACT

This application discloses a fold flat wheeled carrier/wagon/cart, adaptable for a wide array of carrying purposes, including but not limited to cargo, luggage, people, and supplies, featuring optional fold flat retaining walls, handle and wheels. The wagon/cart/carrier wheel assemblies may include simple manually manipulable grips, which the user simply moves to release the wheel assembly and tires, and upon release the wheel assembly and tire is pivoted by spring biasing preferably, and/or is movable to a fold flat profile within the wheeled carrier perimeter and side elevational profile. The application provides for simple internal mechanisms for the wheel assemblies as well as unique faceplates with finger grips. In the stowed, fold flat profile; the wheel assembly may serve to retain the optional retaining walls. Manufacturing construction methods are also disclosed.

19 Claims, 13 Drawing Sheets

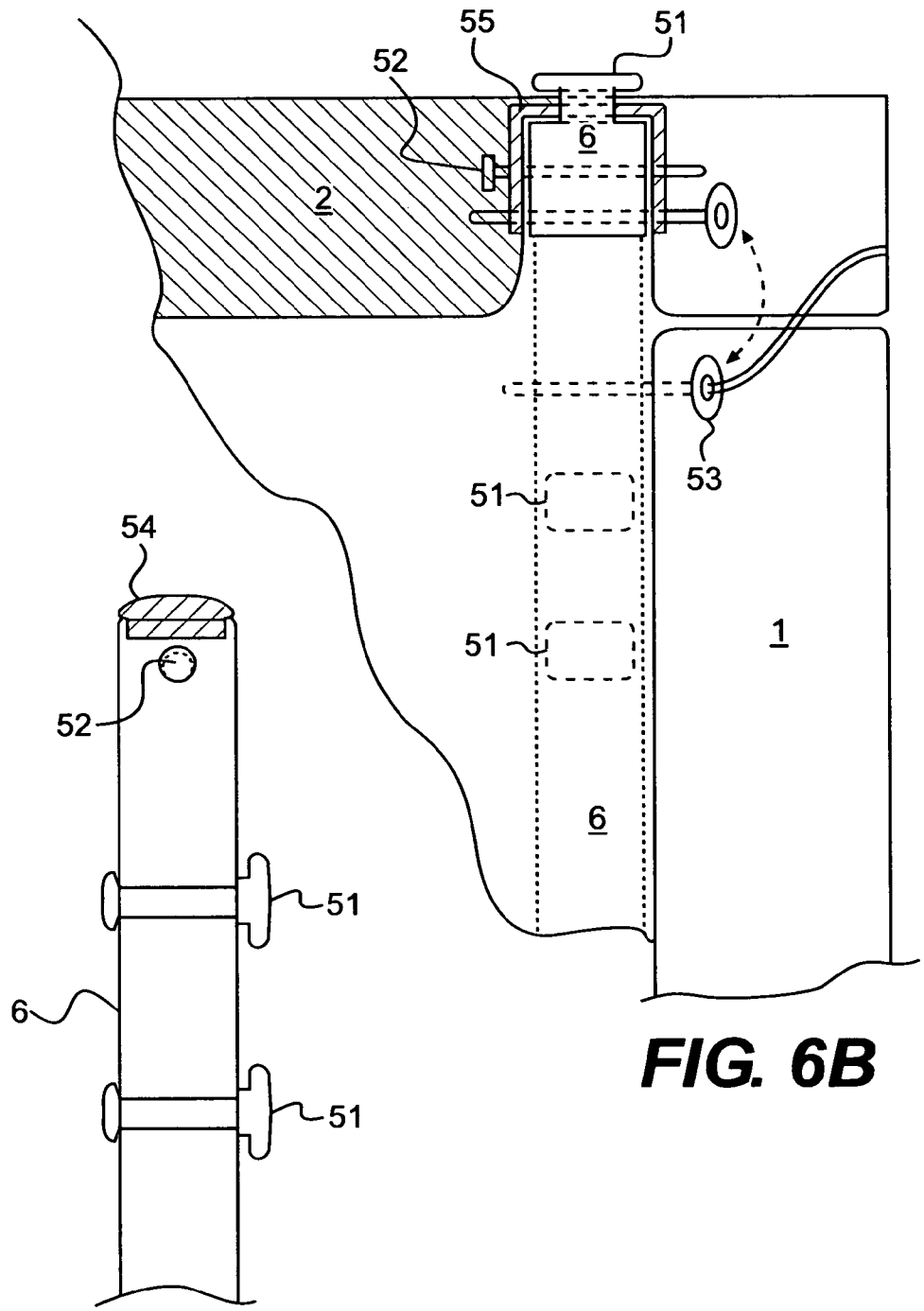

FOLD FLAT CARRIER WAGON/CART WITH STOWABLE WALLS, WHEELS AND HANDLE, AND MANUFACTURING METHODS

RELATIONSHIP TO OTHER APPLICATIONS

This application applies to wheeled carriers/wagons/carts, which carriers fold flat to a thin and compact space saving profile. The wheels, optional retaining uprights/folding walls/seatbacks, and handle all fold flat into a thin side elevational profile. This application discloses and refines "fold flat" wheel assemblies for the carriers, which stowed wheels, in one preferred embodiment, serve to stow/latch other movable and foldable parts including but not limited to the optional retaining uprights/walls. A multiple position handle may be retained by the stowed wheels as well, or may stow flat to the carrier base or underside. Manufacturing methods and other innovations are described in this application.

FIELD OF THE INVENTION

This application relates to novel wheeled carriers and manufacturing methods which provide for fold flat carrier compact/space saving storage, permitting the carriers/wagons/carts to be hung on a vertical wall, or stowed and stacked, and transported compactly in a vehicle.

BACKGROUND OF THE INVENTION

The applicant's prior United States patents, including but not limited to U.S. Pat. Nos. 7,066,485 and 6,893,030 applied numerous types of stowable wheel assemblies to wheeled devices, as well as prior pending U.S. patent application Ser. No. 11/891,024, ("Fold Flat Support Structures . . . ) filed Aug. 9, 2007, applied innovations to support structures, among other innovations. This application applies the applicant's movable and stowable innovations in a unique manner, providing for stowable retaining uprights/folding walls/seat backs, which may be retained in their stowed position by a series of stowable wheel assemblies, and this application provides for an alternate handle grasp and stowed handle position which stows the handle to the carrier base or the underside, and when moved to an operative position, a "keeper" latch may retain the handle in the operative position if folded/stowed to the underside. This application also discloses unique manufacturing methods for the carts/wagons.

SUMMARY OF THE INVENTION

This application provides for compact, stowable "fold flat" wheeled carrier features. One of the improvements in this application relate to simple user finger grips for wheel assemblies, for simple latch mounting along the wheel assembly shafts, for the spring biasing of the entire wheel assembly so that it "automatically" moves to the stowed position inside the perimeter of frame of the wheeled carrier, to provide unique retaining uprights which are vertical in use, and are folded flat when stowed, to provide for a secondary tray/rack, which may be elevated and hung on the vertical retaining uprights/folding walls, and other novel concepts that will become apparent from the descriptions below.

One of the purposes of the invention is to provide for a simple user grip, which is simply a formed portion of an exterior protruding part of the wheel assembly, so that the user may simply use a number of fingers to manipulate the grip portion to release a latch portion of the wheeled carrier wheel assembly, thereby permitting movement of the wheel assembly from the operative, use position, to a compact, stowed position where the wheel assembly is located within the perimeter of the frame, and also within the side elevational profile of the carrier.

Another object of the invention is to provide for a simple method of manufacturing both the base/frame of the carrier as well as the internal components of the movable wheel assembly, which assembly comprises a wheel assembly tire axle, a simple wheel assembly latch, a pivot (or two oppositely extending mounting elements) and a simple user finger grip interface or faceplate that interacts to release the latch.

Another object of the invention is to provide for unique means so that the "faceplate" or user manipulable grip of the wheel assembly connects to other portions of the wheel assembly so that the faceplate may or may not require screws or any parts separate from the faceplate.

Another object of the invention is to provide for simple spring biasing of the pivot of the wheel assembly or any other structure of the wheel assembly, so that once the user releases the latch means, or finger grip, the wheel assembly, by spring biasing, automatically moves to the stowed, compact position inside the perimeter frame and side elevational profile of the carrier.

Another object of the invention is to provide for alternate methods which latch/lock the wheel assembly against movement to the stowed position, or which prevent the releasing movement of the faceplate or finger grip portion.

Another object of the invention is that once the wheel assembly is in the stowed, compact position, the user may move the wheel assembly back into the operative, use position by merely manually moving the wheel, wheel assembly tire axle or support case, then pivoting it out of the interior of the carrier frame, and then "automatically" latching it again in the operative position without the user being required to manipulate any further latch.

Another object of the invention is to provide for unique manufacturing methods to construct the entire main carrier base and frame from one piece of any suitable material which may be folded to form side and end walls, as well as methods for mounting the wheel assembly at least partly within a suitable "C" or "U" or other shaped structural wall or within a tube shaped structure forming part of the carrier device frame. Also, the manufacturing construction may instead involve a base, and end and side walls that interlock together.

Another object of the invention is to provide for unique methods for vertical, stowable retaining uprights/foldable walls, which fold flat, and when operative, are moved and retained in the operative position by virtue of male-female relationship between the uprights and the end walls, with or without retaining pins, and the same uprights/walls/seatbacks may be retained/latched in the stowed position by the stowed wheels.

Another object of the invention is to provide for a first removable floor, which may be a solid sheet or may be flexible material that is rolled out from near one end of the carrier, to the opposite end, and also to provide a secondary tray/rack with two positions, one stowed along the carrier floor, and a second, elevated position, the second position provided for with hook type structures at least near each end, to allow the secondary tray/rack to be lifted for placement in a raised position retained to portions of the retaining uprights in their operative positions.

Another object of the invention is to provide for a multiplicity of straight retaining uprights/walls that may be placed in slots near the corners of the carrier, but can also occupy a stowed position within the side elevational profile of the carrier frame in one or more positions.

BRIEF DESCRIPTION OF THE DRAWINGS

FIG. 6-A is a partially cutaway view of one leg of a vertical upright, showing the detail of an optional male-female protrusion and pivot method employed for latching the upright in the operative position; and FIG. 6-B details the same upright in a top plan view showing the upright within the mounting bracket along the carrier end wall, and in ghost view, shows an upright in the stowed position.

Figure 1:
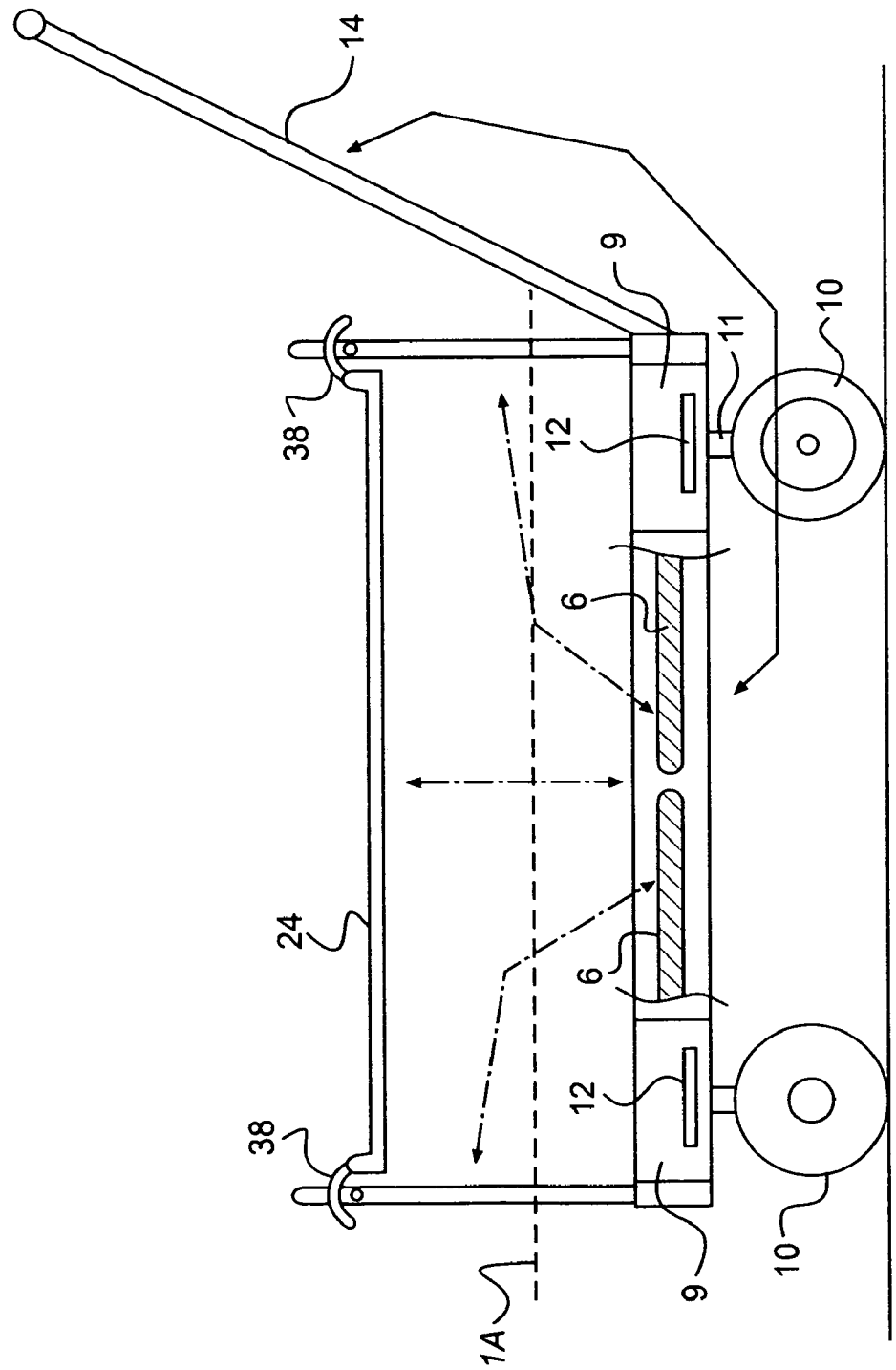
FIG. 1 is a side elevational partially cut away view of the wheeled carrier 1-A, indicating both stowed and operative positions of the uprights, as well as a secondary tray/shelf mountable to the uprights.

DESCRIPTION OF THE PREFERRED EMBODIMENTS:

Referring to the drawings, the following are descriptions of the numbered elements: 1-*a* wheeled carrier; 1 wheeled carrier side frame wall; 2 wheeled carrier end frame walls; 3 wheeled carrier latitudinal support; 4 wheeled carrier longitudinal support; 5 upright receiving slot; 6 upright/wall/seatback; 7 upright shaped foot; 8 retention pin; 9 pivoting wheel assembly; 10 wheel; 11 wheel axle; 12 wheel assembly finger grip; 13 storage position-upright; 14 stowable handle; 15 handle pivot; 16 removable floor; 17 handle keeper latch; 18 handle keeper latch pivot; 19 handle keeper latch post; 19-*b* alternate thumb bolt keeper; 20 end wall handle slot; 21 handle underside latch; 22 wheeled carrier carry bag; 22-*b* carry bag handhold; 23 wheeled carrier wall hanging loop; 24 removable second tray/rack; 25 hole; 26 handhold; 27 pivot; 28 spring; 29 pivoting wheel assembly latch; 30 pivoting wheel assembly latch grip; 31 latch screw receiving hole; 31-*a* screw receiving hole; 32 screw or semi-permanent shaped securing pin; 33 wheel assembly slide plate; 33-*b* wheel assembly slide plate protrusion; 34 pivoting wheel assembly latch finger; 35 sheet spring; 36 straight run upright; 37 straight run right angle shape; 38 removable floor/tray hook; 39 upright pivot/support arm; 40 terminal end retainer; 41 wheel assembly pivot block, 42 interconnection handle/hitch terminal end, 42-*a* single sheet carrier pattern, 43 alternate carrier, 44 pivoting wheel assembly side cover, 45 pivoting wheel assembly side cover screw receiving hole, 46 pivoting wheel assembly mount location, 47 handle receiving slot, 47 transverse support rib, 48 support rib for pivoting wheel assembly, 48-*a* support receiving bracket, 49 corner affixation area, 50 side wall match area, 51 upright latching protrusion, 52 upright pivot pin, 53 upright latch pin and lanyard, 54 upright end cap, 55 upright receiving bracket, 56 interlocking component alternate carrier (variant of carrier 43), 57 base, 58 male-female retention relationship, 59 main handle bracket, 60 handle bracket brace, 61 interconnection support bracket, 62 terminal end retainer.

Figure 2:
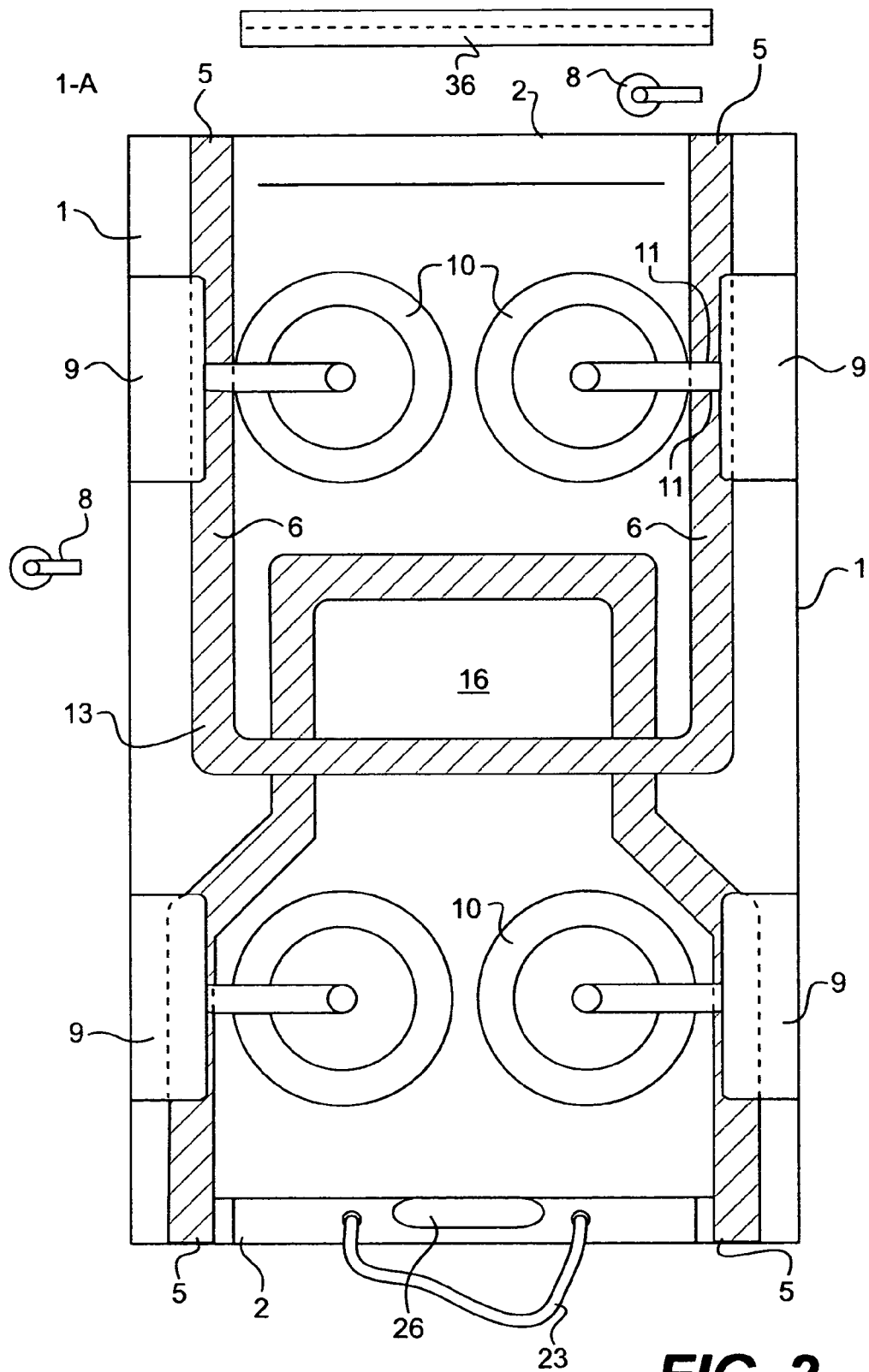
FIG. 2 is a top plan view of the fully stowed wheeled carrier 1-A, showing the stowed retaining uprights, wheel assemblies and alternate straight run uprights.
Figure 3:
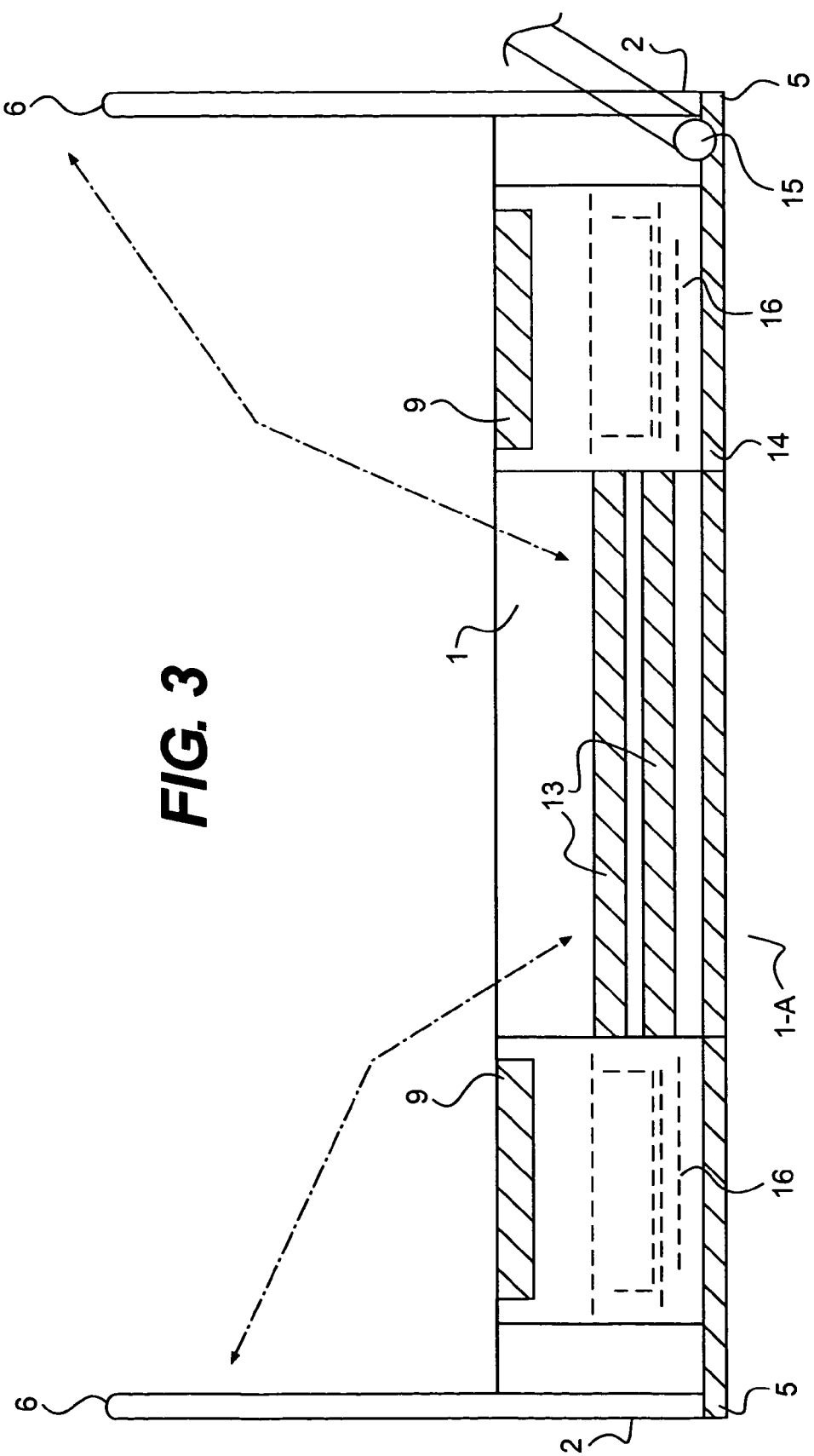
FIG. 3 is a side elevational view showing the stowed parts of the carrier, including the wheel assemblies, indicating the operative position of the uprights and of the handle.

FIGS. 1, 2 & 3 show a wheeled carrier, 1-*a*, incorporating a perimeter frame with sidewalls, 1, end walls, 2, and typically, a set of 4 pivoting/movable wheel assemblies, 9, each including at least one tire. The preferred embodiment of this wheeled carrier includes at least two fold flat retaining uprights/walls, 6. Both FIGS. 2 and 3 show the uprights, 6, and indicate their stowed position at 13. FIGS. 1 and 2 show the uprights, 6, in their operative, vertical position at the terminal ends, and these uprights may serve as retaining walls or seat backs for occupants. Suitable retaining pins, 8, may optionally be employed to retain the uprights, 6, in either the operative or stowed positions shown. FIG. 2 shows the wheel assemblies, 9 in their stowed position, which have a spring biasing that maintains them in close proximity to the carrier base and removable floor, 16 (refer to FIG. 3) serving to retain and latch the retaining uprights, 6 in their stowed position. The uprights, 6, may be partially stacked as indicated in FIG. 3, or may instead be oriented in a non-overlapping orientation. Referring to FIG. 2, are indicated a series of four upright receiving slots, 5, which are shaped in any suitable manner to receive the retaining upright shaped foot portions, 7 (see FIG. 6). The retaining uprights, 6, may merely slide down in the slots or interconnect in any suitable manner with the receiving slots, 5, by virtue of a pivot or support arm, partially shown in FIG. 6 at 39, and may be retained by a retaining pin, 8. FIG. 2 shows a removable floor/tray, denoted generally at 16, however, referring to FIG. 1, there is shown a different secondary removable second tray/rack, 24, which occupies a stored position oriented atop the floor or base, 16 of the wheeled carrier 1-*a*, and the tray/rack 24, has a second operative position where it is raised and/or elevated, and by virtue of a series of hook type structures, 39, the secondary tray forms a storage area at an elevated level. The secondary tray, 24, may be constructed of any suitable rigid or flexible material (forming either a tray or instead forming one or more elongate racks that may support hanging items including but not limited to clothing). Referring now to both FIGS. 1 and 3 is shown a handle, 14, which has a preferred position stowed along the underside of the carrier frame (see FIG. 3) but may instead be mounted along an end wall and instead fold flat above the base. Optionally, either retaining upright, 6, may serve as a push pull handle grasp and may have a portion fold 90 degrees outwards toward a user, to serve as a more ergonomic handle grasp. The handle of carrier 1-*a* is mounted along a pivot, 15, and is movable to an operative position where it is angularly disposed at least partly above the side elevational profile of the wheeled carrier frame, as shown best in FIG. 1. FIG. 1 also shows the wheel assemblies, 9, each having a wheel axle, 11, along with at least one wheel, 10, in their operative positions. Each wheel assembly, 9 includes at least one finger grip latch, 12. To move each of the tires, 10, to their stowed position, as shown in FIG. 2, the preferred embodiment provides that the user manually move the finger grip, 12 upwards, which serves to release the wheel from the operative position, and spring biasing provides that the tire then "automatically" moves to the said stowed position shown in FIG. 2, where it may serve to also latch/retain the retaining uprights (or, the uprights may overlap, not shown here). FIG. 2 also shows one of a series of alternative straight uprights, 36, which each also fit into the upright receiving slot, 5. Should the user desire to move oversize cargo, but still have retaining uprights at the four corners, then a series of "straight run" uprights, 36 may be desirable. These uprights are designed to conveniently stow inside the perimeter and side elevational profile of the carrier end walls, 2, or the carrier sidewalls, 1, and one or more retaining pins, 8 may be used for this purpose. Last, FIG. 2 also shows an area that may comprise a handhold, at 26, although the location may be anywhere along the side walls, 1, or the end walls, 2. Alternatively, the fully stowed wheeled carrier may be hung on any vertical wall, using a flexible or rope-like material including but not limited to a wire cable, as shown in FIG. 2, at 23.

Figure 4:
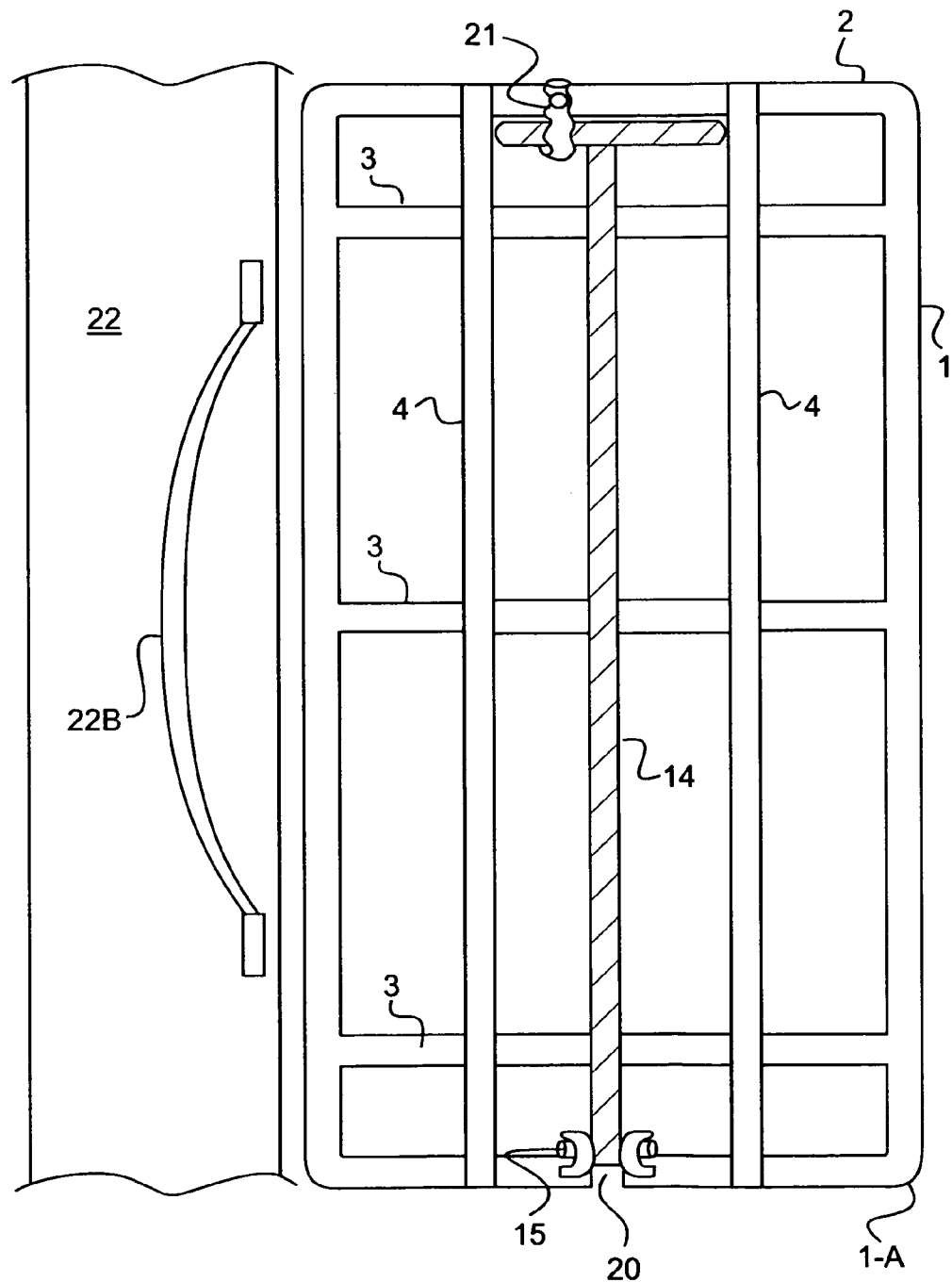
FIG. 4 is an underside plan view of the wheeled carrier showing one handle embodiment in stowed position latched to the carrier underside, also showing the handle pivot mount and a flexible material carry bag.
Figure 5:
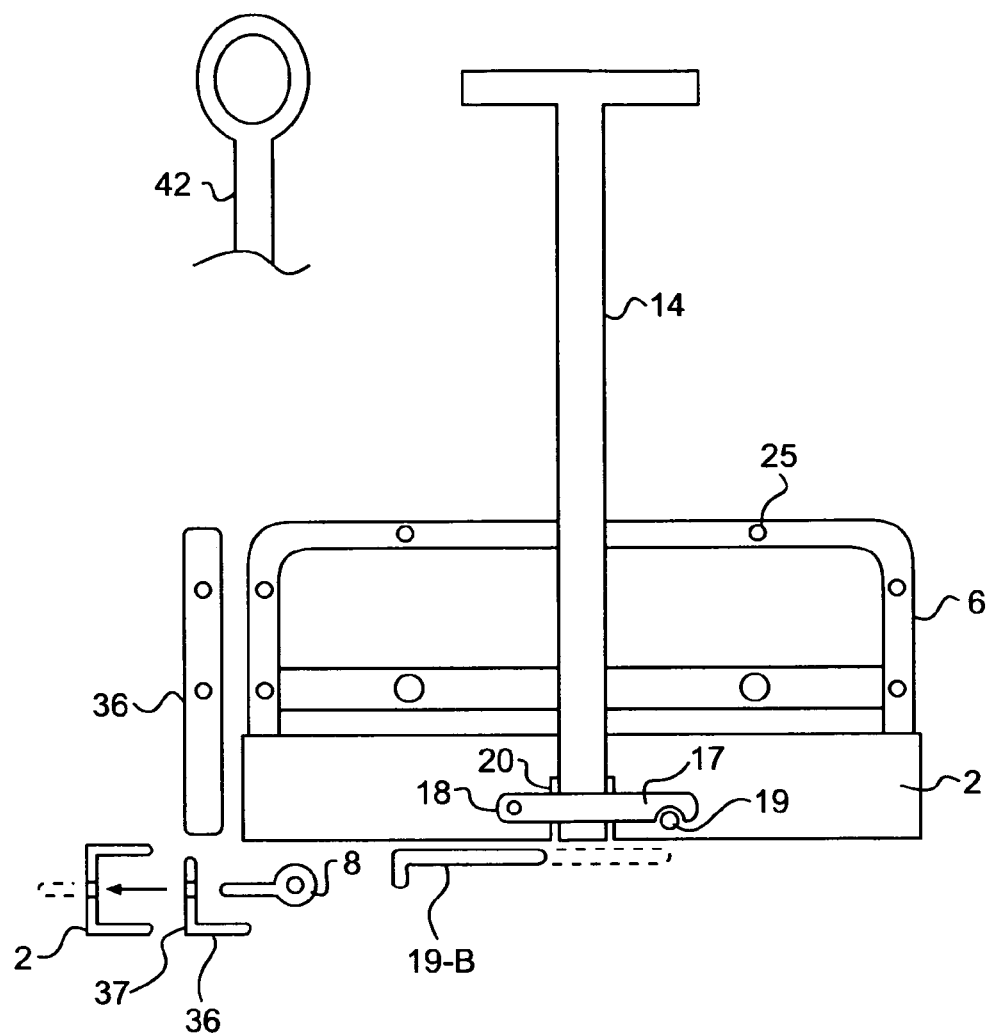
FIG. 5 is an end elevational view of the carrier, 1-a showing a retaining upright/wall/seat back as well as a handle in the operative positions, and showing the alternate straight run upright as well as its mounting method with a pin retainer; as well as an alternate handle with interconnection terminal end, for attaching the wheeled carrier to any suitable wheeled device, whether or not motorized.

FIGS. 4 & 5 detail one handle design for the wheeled carrier, 1-*a*. FIG. 4 is an underside view of the wheeled carrier, which shows a series of latitudinal supports, 3, and shows a series of longitudinal supports, 4. The elongate handle, 14, is mounted along a pivot, 15. Any grip portion may be employed on this handle, however a "T" shaped grip is shown here, and it is retained in this stowed position by virtue of a handle underside latch, 21. Any latch may be employed, but in this drawing, a simple hook and loop fastener method is shown. Depending on the exact pivot location, 15, it may be necessary to have a slot, 20 as shown in the end wall frame closest to the pivot for the handle (FIGS. 4 and 5). FIG. 5 shows the handle, 14 in the operative position, where it is pivoted through the slot, 20 and is maintained in an upwards angular position by a keeper latch, 17, which serves to block the handle from dropping downwards through the slot. In one embodiment shown, the keeper latch, 17 pivots along a pin, 18, and is movable onto, and off of, a small post, 19. An alternative keeper is shown at 19-*b* in FIG. 5 also. This alternative keeper is a thumb bolt type design, which slides latitudinally between an opened and closed/latched position. FIG. 5 also shows the retaining upright, 6, in an operative position and indicates any series of holes or open areas, 25 may be included in the uprights, for retaining the secondary tray, 24, shown in FIG. 1. FIG. 5 also depicts a "straight run" upright, 36, which although may be any shape, in one preferred embodiment is a right angle shape as shown. FIG. 5 shows an end elevational view of the side frame, 2, cutaway for illustration, indicating at 37, how the right angle upright, 36 may fit in to a corresponding shaped portion of the side frame, 2, and a retaining pin, 8 may also be employed to stow the upright, 36 as shown. Referring back to FIG. 4, there is shown a flexible material storage bag, 22, which may also include a suitable strap, handhold or shoulder strap indicated at 22-*b*. The storage bag serves to hold a completely stowed wheeled carrier, and additionally that bag may have a wall hanging portion for hanging the entire unit on the wall. Finally, FIG. 5 shows an alternate handle terminal end, 42, may be employed, which allows the handle to serve as an interconnection hitch, to connect the carrier to a motorized or non-motorized vehicle.

Figure 6:
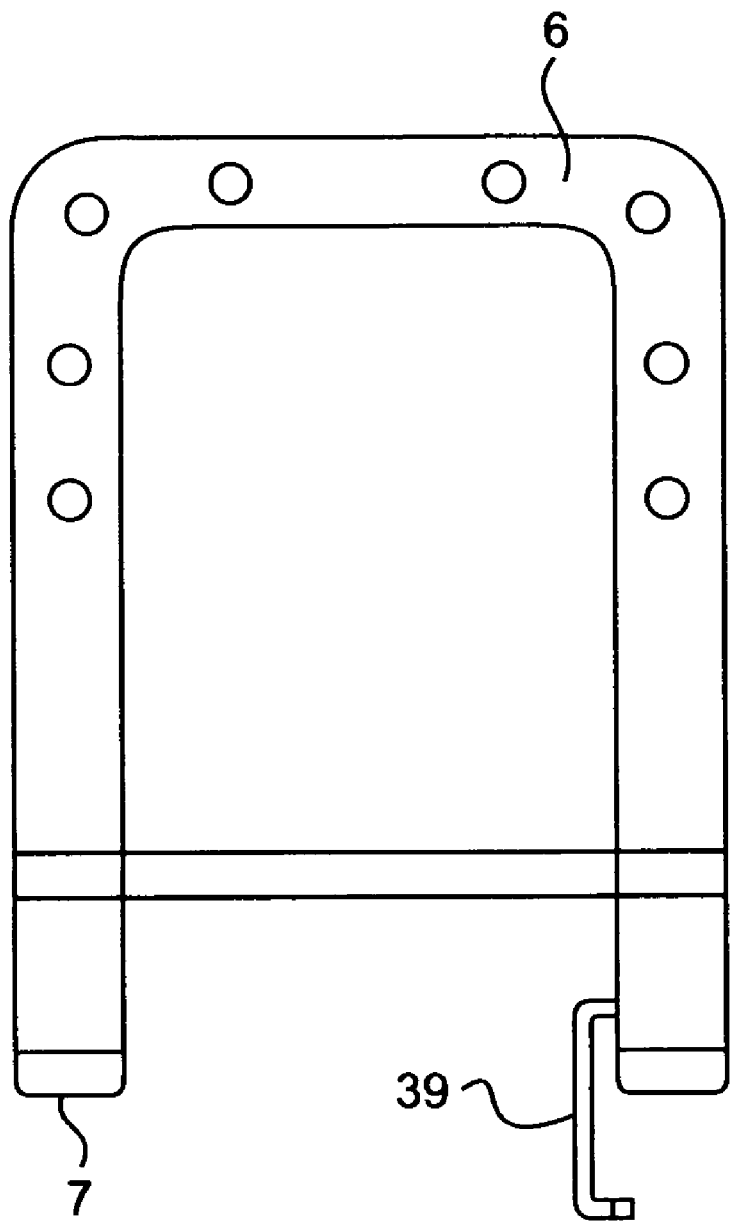
FIG. 6 is a side elevational view of one of the retaining uprights, as well as one pivot/retaining arm.

Referring to FIG. 6 is shown a vertical upright, 6, previously described. The embodiment shown is but one example of innumerable shapes and orientations for the upright/wall. Also shown, for sake of example, is a retaining upright pivot/support arm, 39. A series of the pivot/support arms, may serve to interconnect the retaining uprights in or near proximity to the upright receiving slots, 5 (see FIG. 2). In this manner, the retaining uprights would be semi-permanently retained to the carrier, and move between the stowed in the operative positions, by lifting and/or pivoting them between the two positions. FIGS. 6-*a* and 6-*b* disclose alternate retaining uprights, 6, which are instead retained by a pin 52, which retains a terminal end of the upright 6 in a receiving bracket 55, near the end wall, 2 (the bracket 55 may instead be a formed part of the end wall 2). The upright 6 may use an end cap 54 with a rounded shape to promote the pivot motion of the upright from the operative orientation shown in FIG. 6-*b*, to the stowed position also shown in the same figure in ghost outline. The latching of the upright 6, when in the operative position, is accomplished by any number of male protrusions, 51, mounted to the uprights (FIGS. 6-*a* and 6-*b*) which pass through openings in the carrier end wall, 2 (see FIG. 6-*b*, showing protrusions 51 oriented through opening in end wall 2, while the shape of the openings in not shown, any suitable shaping may be employed). The shape of the openings in the end walls 2 is keyed so that the protrusions 51 pass through a shaped opening, however, the uprights are mounted on an elongated slot (the elongate slot may either be on the upright 6, or on the upright bracket 55) so that the uprights have some vertical movement on the pivot of the mounting pin 52, when vertically oriented. This permits the uprights to be moved to the upright, vertical position, allowing the series of protrusions 51 to pass through end wall matched openings, and then the upright slides slightly downwards and a portion of each protrusion is captured by the vertical portion of the end wall 2. The upright may be latched in the vertical position by any movable latch that prevents vertical movement of the upright, and is movable to then allow the upright to be stowed (not shown). The protrusions may be reversed if desired, so that male protrusions may be in a fixed relationship along the end wall, and instead female portions may be incorporated in the upright. Also, if desired a latching pin 53 may be employed to latch the upright when in either or both of the operative or stowed positions. The latching pin 53 may be attached to the carrier by a lanyard as shown, so that one pin 53 may pass through portions of the end wall 2 to retain the upright 6 vertically in use, and then may be removed and relocated to latch the upright 6 in the stowed position all as shown in FIG. 6-*b*.

Figure 7:
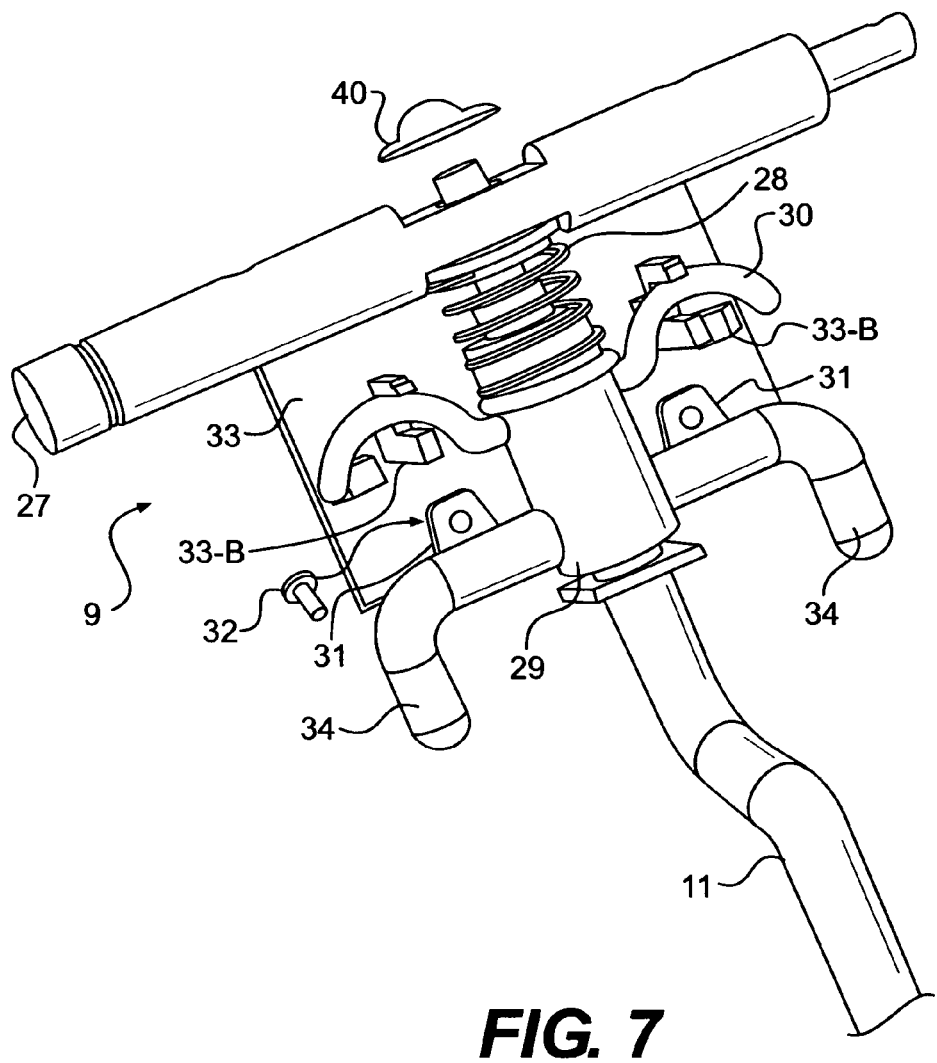
FIG. 7 is a side elevational interior view of a wheel assembly, exploded away from the carrier frame, showing various internal parts as well as one embodiment of a finger grip mounted to a wheel assembly case exterior face.
Figure 8:
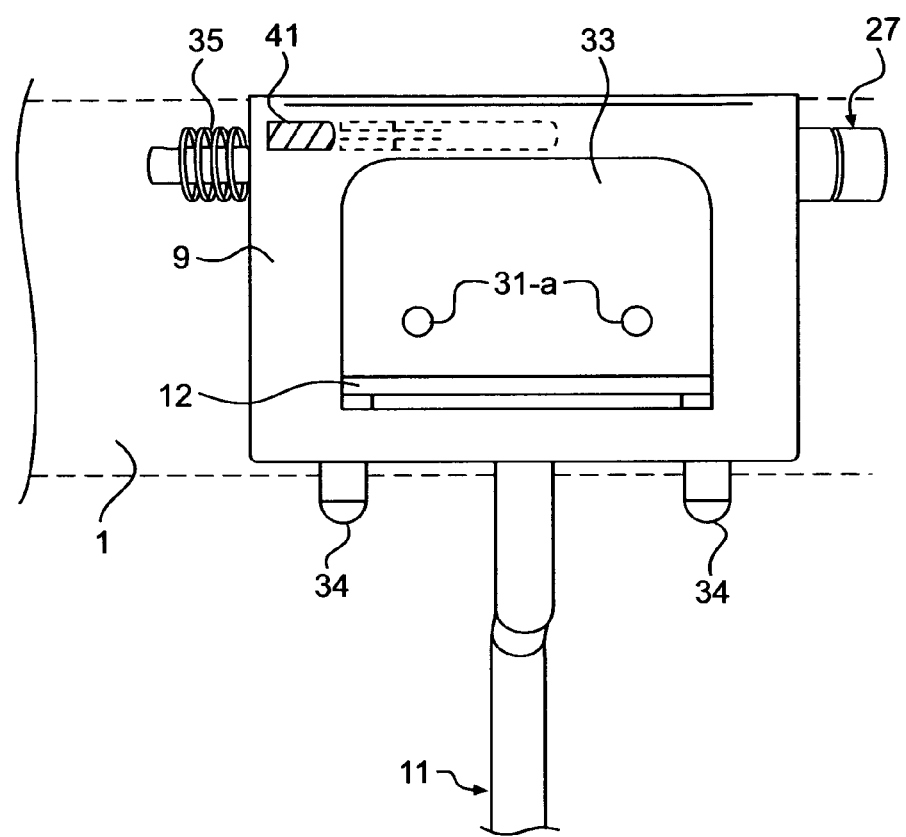
FIG. 8 is a side elevational profile of the wheel assembly of the wheeled carrier, from the exterior, showing the wheel assembly in the operative position with the carrier frame cutaway and not shown, the figure also shows an alternate locking or latch structure to prevent release of the wheel assembly.

Referring to FIGS. 7 and 8 are shown views of the wheel assembly components and manufacturing construction. FIG. 7 is a partially cutaway view of a wheel assembly 9 internal components, viewed from the carrier interior looking outwards, whereas FIG. 8 is an exterior view of the wheel assembly, 9. In FIG. 8 the wheel assembly 9 is shown with the side frame, 2, hidden. The wheel assembly, 9, the interconnected wheel axle, 11, and the wheel (not shown) are released from the operative position when the user presses upwards on the assembly finger grip latch, 12, (here, which is merely a portion of the faceplate, 33, of the wheel assembly-see FIG. 8) which upward movement serves to also upwardly move a pair of pivoting wheel assembly latch fingers, 34. The latch fingers, 34, are urged downwards by spring biasing. When a wheel assembly, 9, is released from the operative position shown in FIG. 8, it is spring biased to pivot and move to the stowed position along with the tire, 10,—to inside the carrier frame Any suitable spring biasing may be used, however, the preferred embodiment shown in FIG. 8 adopts a spring, 35, which is mounted to any portion between the pivot, 27, on which the wheel assembly pivots, and a fixed surface, such as a portion of the side wall, 2. FIG. 8 also shows a secondary latch, 41. The purpose of this latch, 41 is to prevent the wheel assembly from releasing from the operative position at all. For one example of many, the secondary latch, 41 is merely slid vertically, whereby internally a portion of this secondary latch blocks movement of any portion of the latch (34) mechanism such as the central tire axle, preventing a wheel assembly, 9, from releasing from the operative position. FIG. 7, showing the internal components, shows how a vertical wheel axle, 11 travels up and has mounted around it, the pivoting wheel assembly latch, 29, which latch component incorporates a pair of the downwardly directed pivoting wheel assembly latch fingers, 34, and also includes a pair of screw receiving holes, 31. The purpose of the screw receiving holes, 31 on the main latch is to secure the exterior sliding/movable face plate, 33, to a case or enclosure of the assembly (not shown in FIG. 7, but see FIG. 8) which may include a finger grip portion, 12, with suitable screws, 32, that travel through screw holes in the finger grip latch 12, denoted 31-a. Further, the main latch, 29, in this preferred embodiment, also includes a pair of wheel assembly latch grips, 30 (FIG. 7). The wheel assembly latch grips, 30 are a secondary source of upwardly moving the wheel assembly latch, 29, if for any reason the faceplate or finger grip on the faceplate is not employed, or is removed or broken, and alternatively, one or more finger grips, 30 may be employed instead of having an exterior faceplate, 33. If the exterior faceplate, 33, is not secured with suitable screws, 32, to the screw receiving holes, 31, than alternatively a shaped portion of the exterior faceplate, 33 may entrap a portion of the wheel assembly latch grips, 30 serving as the means to move the latch upwards to the release position, as an alternative mechanism, and openings in the assembly case or enclosure provide finger access to these grips, 30. It is appreciated that rather than screws, 32, semi-permanent male-female pins or resilient retention may be employed to attach the face plate, 33, to the internal components of the wheel assembly, 9. Above the central latch, 29, is shown a spring, 28, which urges the central latch, 29, downwards to maintain the latch in the operative position. Also, FIG. 7 shows that a portion of the wheel axle, 11 travels upwards and through the pivot, 27 and is then secured by a terminal end retainer, 40. In use, upward movement of the central latch, 29, releases the downwardly directed latch fingers, 34, from a corresponding hole in which the downwardly directed fingers descend through any suitable portion of the side frame, 2 of the carrier device.

Figure 9:
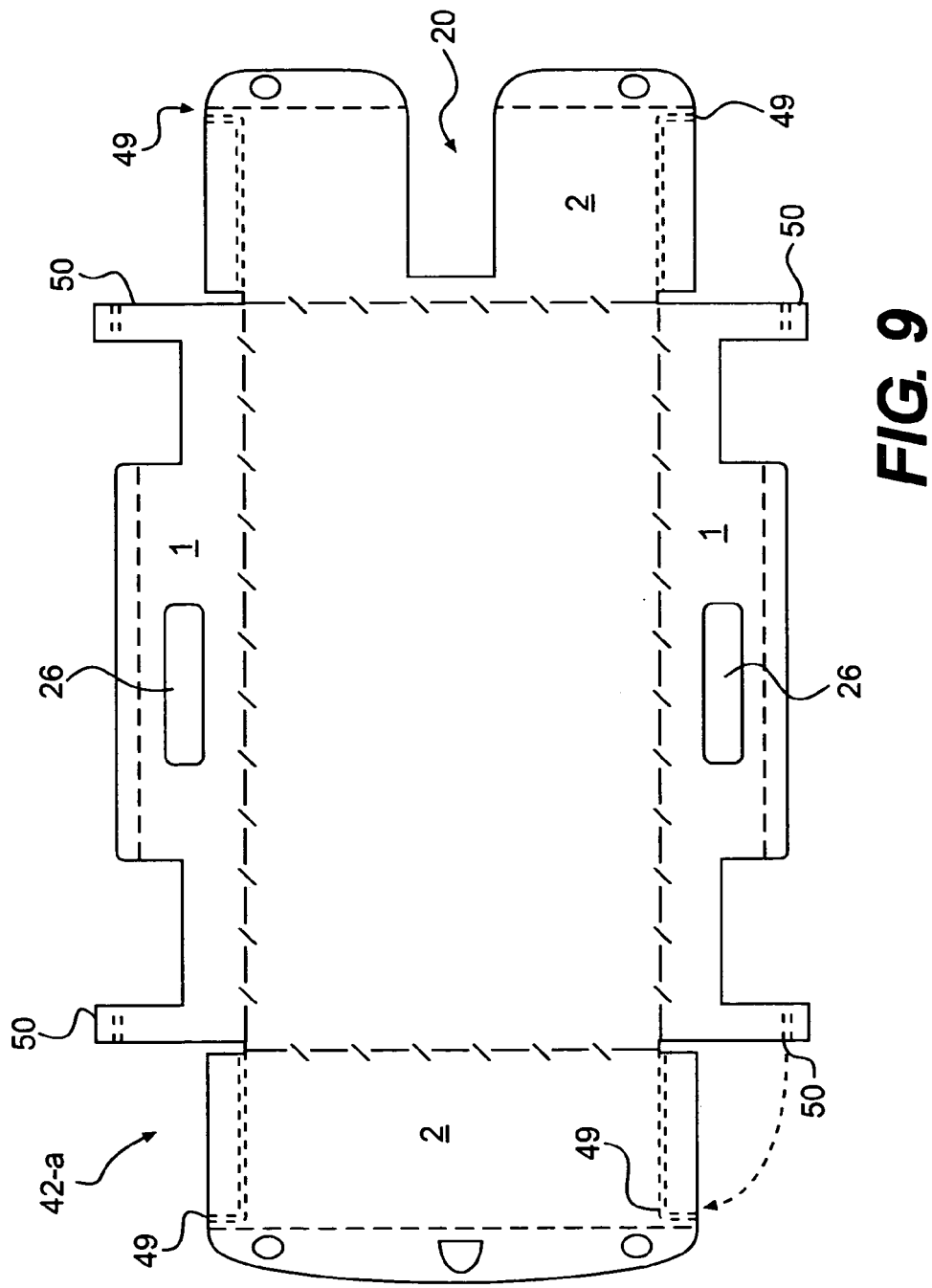
FIG. 9 is a top plan view of an alternative wheeled carrier, 42-a, showing a single sheet of suitable material prior to its fabrication into a wheeled carrier as described in the application.
Figure 10:
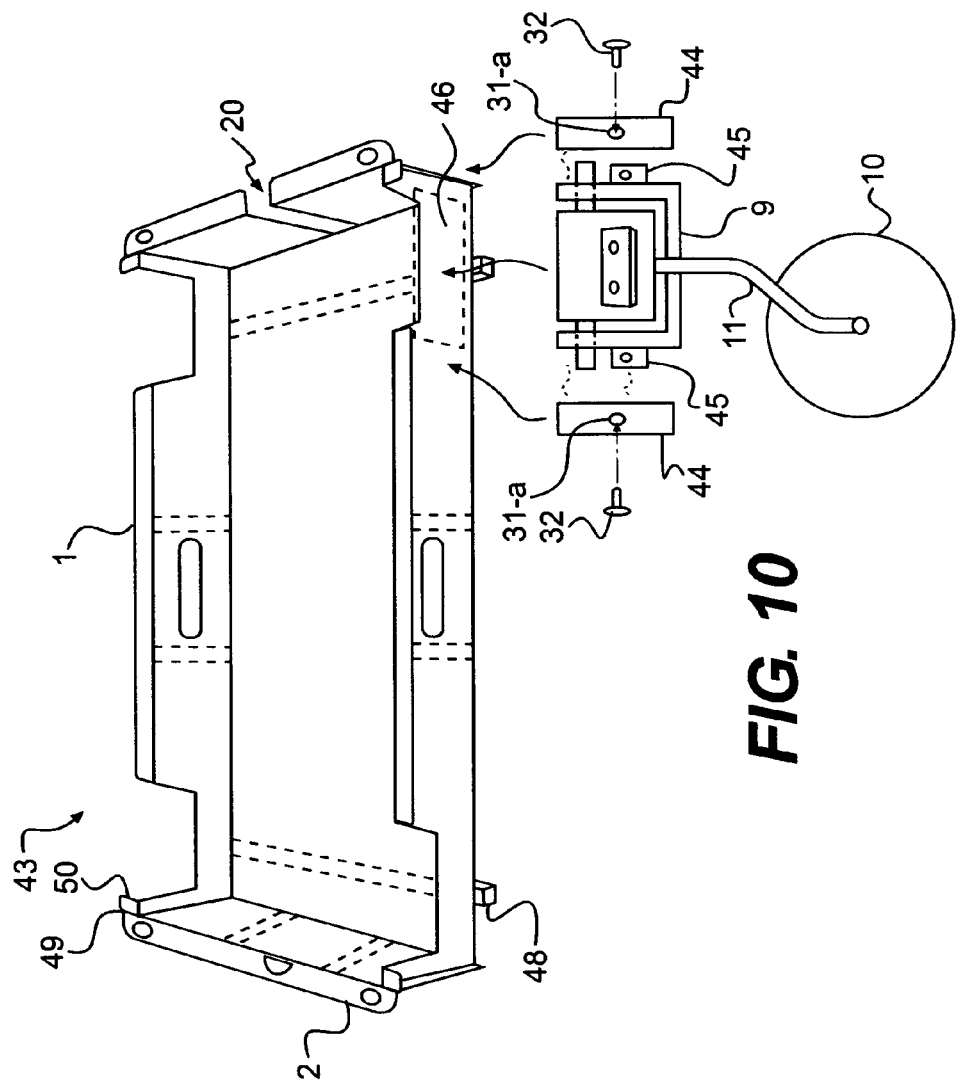
FIG. 10 shows alternate wheeled carrier 43 in a side elevational view, slightly elevated, after the single sheet of material is fabricated into the wheeled carrier form, further indicating the mounting method of the pivoting wheel assembly to the carrier.
Figure 11:
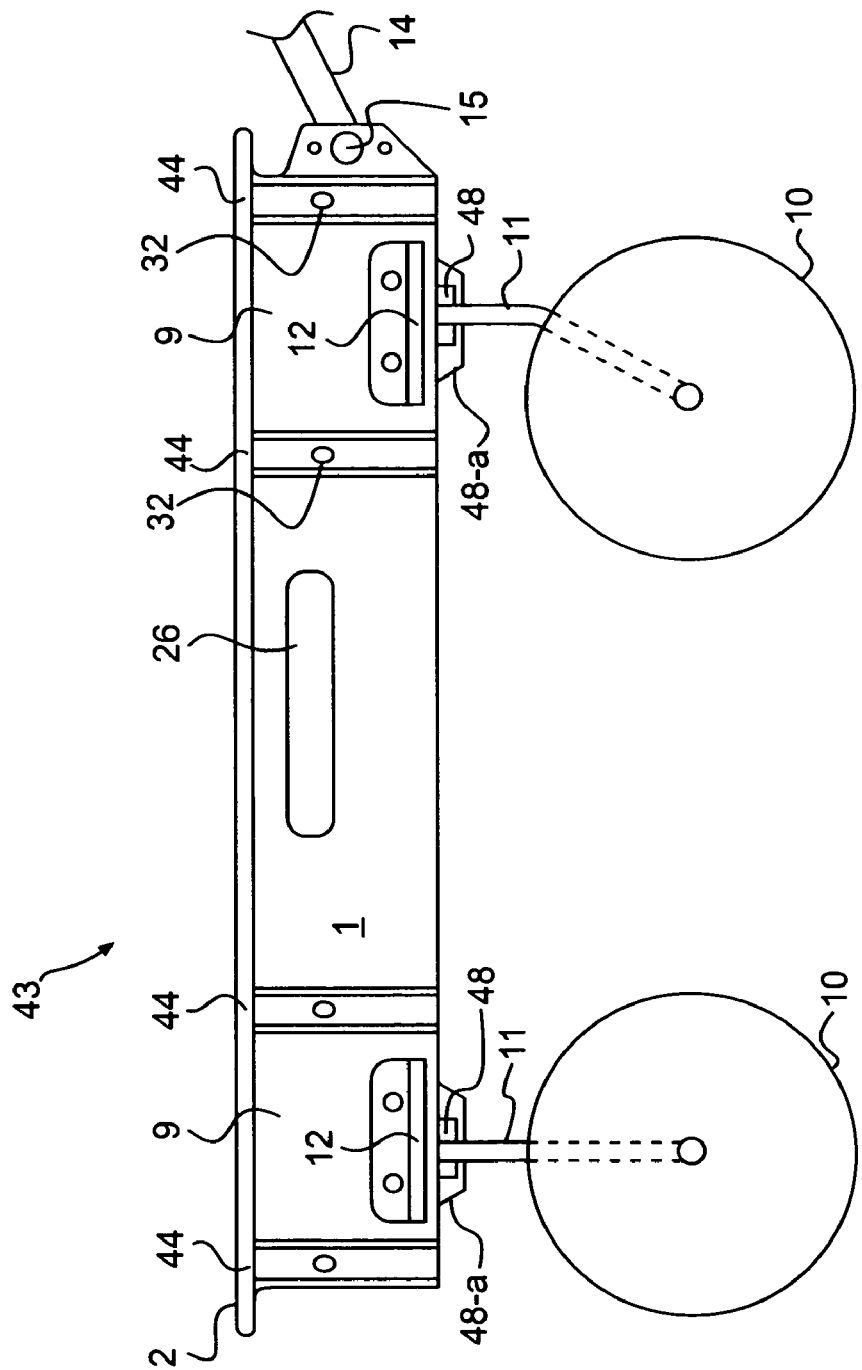
FIG. 11 is a side elevational view of alternate carrier 43, in a fully manufactured status with the wheel assemblies mounted and shown in the operative position and with the handle bracket and handle mounted.

FIG. 9 shows a single sheet of material, 42, prior to its fabrication into the alternate wheeled carrier 43, as shown further in FIGS. 10 and 11. FIG. 9 shows one preferred embodiment of the pattern of the single sheet of material 42, indicating side walls 1, and end walls, 2, and opening or slot, 20 which accommodates the stowable handle, 14, as shown in FIG. 11. In manufacturing fabrication, the above referenced side and end walls, with a ninety degree lip formed by folding, as indicated by dashed lines near the pattern periphery, are formed by folding the material inwards ninety degrees, along the dashed/hashed lines indicated around the rectangular pattern shown in FIG. 9. At the four corners and edges of each side wall, the side walls, 1, have a match area 50 with the end walls, 2, indicated at 49, and at this match area the end and side walls are secured together by any suitable method such as welding, nut and bolt, or male-female connection with no additional parts (also shown at 50, by the dashed lines, the formed side wall, 1, may be formed or bent to match the end wall lip profile). 26 indicate an opening for a user handhold formed out of the material. FIGS. 10 and 11 show the formed material pattern 42 once fabricated into the alternative carrier 43. FIG. 10 also indicates that any number of transverse support ribs, 48, may be employed (also, such support ribs may instead be longitudinal an orientation from end wall to end wall, not shown). FIG. 10 further shows an exploded view of a pivoting wheel assembly, 9 including wheel axle, 11 and wheel, 10, as well as wheel assembly side cover screw receiving holes, 45. Preferably, prior to mounting each wheel assembly, 9 to the carrier, the wheel assembly, 9 is assembled, and then wheel assembly side covers, 44 (which may be manufactured identically, and reversed to create a left and right side cover) serve to hide access to the wheel assembly pivots (see FIGS. 7 and 8), and in any case, a screw or bolt 32 passes through the side cover, 44, the pivoting wheel assembly side cover screw receiving hole, 45, and then may optionally pass through an opening in the wheeled carrier frame, preferably at the side wall, 1, to secure the entire pivoting wheel assembly, 9 to the wheeled carrier frame (which may be manufactured with a rivet rather than a screw 32). Depending upon structural strength requirements, additional securing of the wheel assembly, 9 may be employed at the area of the wheeled carrier frame generally indicated at area 46 in FIG. 10, which may be by nut and bolt, by rivet, by male-female relationship of the assembly and the frame, and/or a separate shaped mounting bracket (none shown in FIG. 10) may be employed between the wheel assembly 9 and the carrier frame. FIG. 11 shows the alternate wheeled carrier 43 fully assembled with wheel assemblies in the operative position. The pivoting wheel assembly side covers, 44 are shown mounted to the wheeled carrier side walls, which additionally serve to secure the wheel assembly, 9 to the wheeled carrier side wall and frame. Preferably, the user releases the wheel, 10 from the operative position shown in this figure, by upwardly manipulating the wheel assembly finger grip, 12. As disclosed elsewhere, spring biasing interacts with the pivot, 27 (not shown in this figure) so that when the finger grip is manipulated upwards, the wheel assembly and associated wheel or wheels, automatically pivot inwards to the fully stowed position inside the wheeled carrier side elevational profile and frame. FIG. 11 also shows a support rib/bracket, 48, positioned between the wheel assembly 9 underside and the wheeled carrier 43 underside. This support rib/bracket, 48 is employed to strengthen the position of the wheel assembly, 9 along the wheeled carrier frame. The bracket 48 may be a formed part of the wheel assembly, 9, or may be a separate bracket. Also, rivet/bracket 48 may be affixed or mounted to an underside transverse support rib secured to the carrier frame underside, creating a union with the wheel assembly providing for structural securement between the carrier frame and the wheel assembly, 9. FIG. 11 also shows a handle, 14 with a pivot, 15. The bracket which holds the handle may merely be a formed portion of the end wall, 2, or a separate handle receiving bracket may be secured to the end wall, 2.

Figure 12:
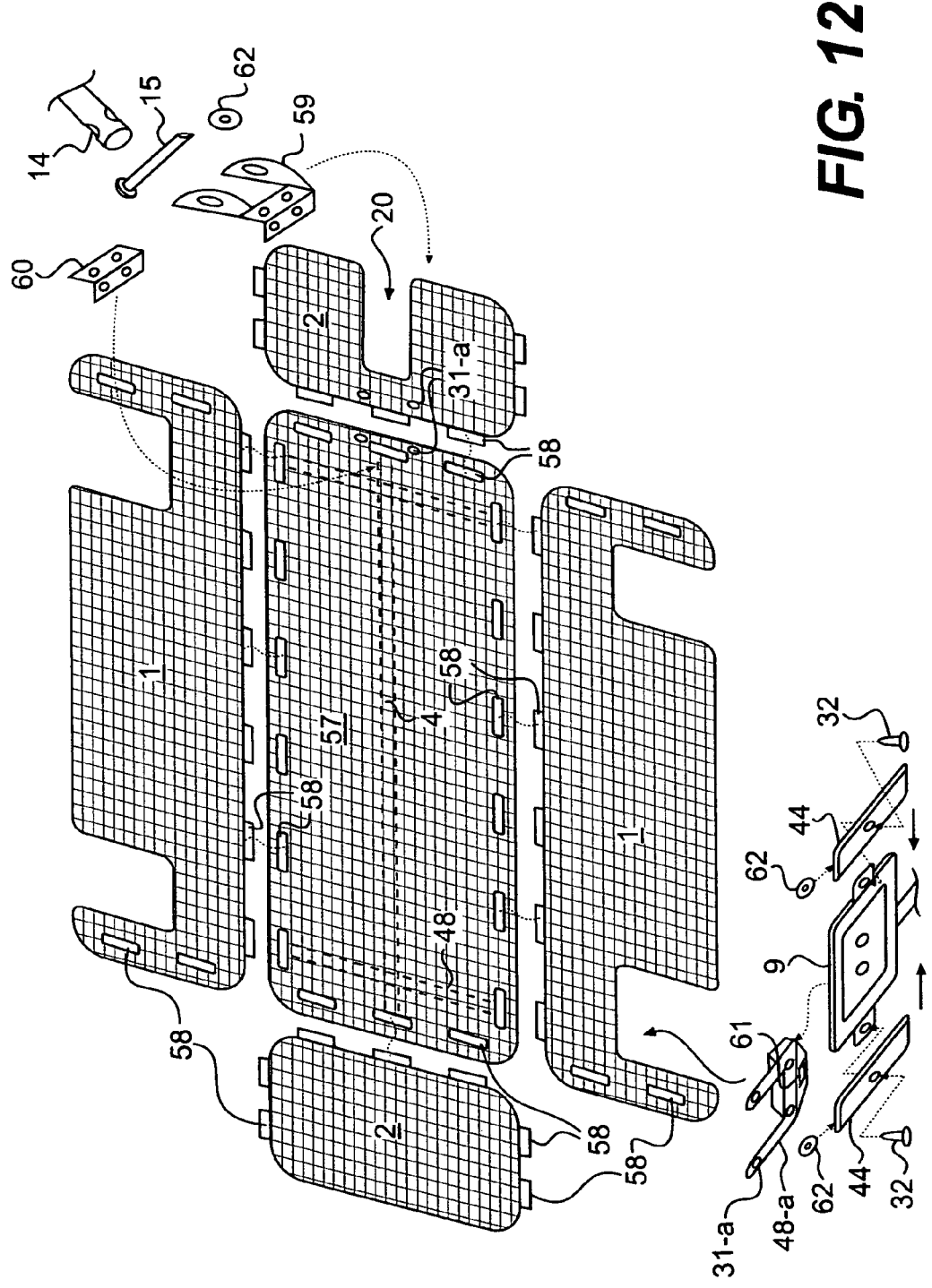
FIG. 12 is a side elevational view, elevated of alternate interlocking carrier, indicating an alternative manufacturing construction with interlocking walls and carrier base, further secured when assembled by mounting of wheel assemblies, optional underside supports and a handle bracket.

FIG. 12 shows one of several manufacturing construction methods for another alternative "interlocking" component carrier (variant of carrier 43). Rather than form the wheeled carrier from a single sheet of material, 42 (as shown in FIG. 9), the side walls, 1, and the end walls, 2, may be manufactured with interlocking male female interconnection points between these parts and the substantially flat base, 57. Essentially, each wheel assembly, 9, when mounted to the carrier, serves to further secure each side wall, 1 to the carrier base, 57, as well as to secure each end wall, 2 due to the interlocking of all the component parts, with any suitable male-female retention, as indicated at 58. As detailed in FIG. 10, the wheel assembly 9 internal parts are preferably first constructed, and then in assembly, covers, 44, are added, and a screw 32 passes through the cover, through an ear of the wheel assembly with a screw receiving hole 45, then optionally through a support receiving bracket 48-a, and then these parts are retained to both the side wall 1, and partly to the base 57 (the support receiving bracket 48-a further interconnects the parts) and the securement is with at least one pair of screws 32 and terminal end retainers 62, preferably on the inner aspect of the side walls 1. Additionally, transverse carrier support may be provided by the latitudinal support rib(s) 48 which may also interlock with an underside aspect of the support receiving bracket 48-a on each side of the carrier. If desired, a longitudinal support 4, may interlock the supports 48 with the handle bracket 59 at the underside also (interconnection with bracket 59 not shown in FIG. 12). FIG. 12 also partly reveals that a pair of transverse supports 48, and four wheel assemblies, 9 may form a chassis by being interconnected with a transverse support rib, 48, and optionally a longitudinal support rib 4 may be a part of the chassis interlocking configuration. The "chassis" may be constructed before the base 57 and side or end walls are assembled if desired.

The longitudinal support rib 4, if employed, may also serve to secure a handle, 14 and handle bracket, 59, and the securing of the handle bracket to the end wall 2, may be further secured with a handle bracket brace 60, which may serve to secure the main handle bracket, 59, end wall 2, and base 57 together. Any male female interlocking construction of the separate base 57 and wall 1 and 2 may be employed, and the components (base 57, and side walls 1, and end walls 2, may be solid in construction, or may employ a honeycomb construction which still allows for the interlocking male-female relationship between the parts when assembled.

It is appreciated that any of the alternate designs shown may be mixed and matched with variants of the innovations shown in various other figures. A handle also may fold flat to the interior, upper side of the carrier device rather than the underside embodiment discussed herein. Two, three of four wheel assemblies may be employed rather than four as shown in various figures, or if 2 wheels are employed, any suitable prop or support stands may be mounted to the carrier underside, and the wheel assemblies may be mounted either on the side frame walls, or along the end frame walls as well without departing from the nature of the inventions outlined. Also, the retaining uprights may serve as folding walls and/or as seat backs for occupants.

What is claimed is:

1. A wheeled carrier device including at least a hand grasp, comprising:
    a carrier base, defining at least a partial floor and a plurality of upright stub walls forming a side elevational plane and profile, the partial floor and walls are formed from a planar sheet of material having a pattern,
    a series of slits are created in the pattern to permit bending of predetermined portions of the planar sheet of material; and
    wherein the predetermined pattern of the planar sheet of material is folded upwards near a peripheral edge of the carrier base, the upright stub walls forming a substantially vertical plane with free upper edges orthogonal to a substantially horizontal floor plane; and
    at least two wheel assemblies, each of the at least two wheel assemblies including a housing defining a substantially vertical plane, with at least one wheel interconnected to the housing by a wheel axle, and wherein the at least one wheel is movable between an operative position where the at least one wheel is oriented substantially parallel with the housing vertical plane, and a stowed position where the at least one wheel is oriented substantially orthogonal to the assembly housing vertical plane, and one of each of the at least two wheel assemblies are affixed to opposing sides of the carrier device; and
    in the operative position the at least two wheel assemblies, and their associated wheels, provide rolling support of the carrier device, and in a second, stowed position, each of the at least one wheel's of each of the at least two wheel assemblies are located within the interior carrier space, substantially within the side elevational profile of the stub walls, and wherein at least one movable retaining upright wall is formed with a shaped angle which corresponds to shaping of at least part of a receiving slot formed in the base near the carrier perimeter so that the shaping of the retaining upright wall is retained within the receiving slot when the upright wall is placed in a first, operative position, substantially vertical to a rolling surface, and in a second, stowed position of the movable retaining upright wall it is stowed within the side elevational profile and perimeter of the base.

2. A wheeled carrier device in accordance with claim 1 wherein the device includes a movable handle, which in a first, operative position is angularly disposed upwards for use, and in a second, stowed position, is pivotably movable to a parallel configuration with the partial floor of the wheeled carrier device.

3. A wheeled carrier device in accordance with claim 1, wherein the latch includes at least one shaped portion providing a finger grip, and manual movement of the at least one latch finger grip releases a male-female connection between each of the at least two pivoting wheel assemblies and the carrier base.

4. A wheeled carrier device in accordance with claim 1, wherein the partial floor and a plurality of upright stub walls with free upper edges interlock together by male female connections between the partial floor and the upright stub wall components.

5. A wheeled carrier device including a hand grasp, comprising:
    a base defining a side elevational profile and a perimeter; and
    at least two pivoting wheel assemblies mounted on opposite sides of the base, each including at least one wheel; and each of the at least two pivoting wheel assemblies includes at least one substantially horizontal support pivot, at least one substantially vertical tire support axle affixed to the substantially horizontal support pivot near a first end and near a second end the axle is interconnected to at least one wheel, at least one latch which retains each of the at least two pivoting wheel assemblies to the base in a first operative position, and the latch is interconnected at least partly to the wheel assembly, and a spring is mounted at least partly to one of the at least two wheel assemblies, wherein a spring biasing urges one of the at least two pivoting wheel assemblies the latch into releasable retention to the base by at least one male-female connection, and;

each of the at least two wheel assemblies are movable from the first, operative position wherein each of the at least two wheel assemblies provide rolling support to the carrier device and a second, inoperative position wherein the latch is released from the male-female connection, and the at least two pivoting wheel assemblies and their associated at least one wheels are folded so as to overlie the base and are situated substantially within the perimeter and side elevational profile of the carrier device; and a spring biasing of at least one wheel assembly toward a flat surface of the base causes one of the at least wheel assemblies to be swept from the operative position, to the stowed position, when the latch is released from the first operative position, and including a face plate component, defining at least one latch connector connecting the face plate to the latch, and at least one retaining means connecting the face plate to at least one surface of each of the at least two pivoting wheel assemblies and also including at least one shaped face plate grip portion, and manual movement of the at least one face plate shaped finger grip portion releases the male-female latch connection between the wheel assembly and the carrier base, at least in the said first, operative position.

6. A wheeled carrier device including a hand grasp, comprising:

a base defining a side elevational profile and a perimeter; and at least two pivoting wheel assemblies mounted on opposite sides of the base, each including at least one wheel; and each of the at least two pivoting wheel assemblies includes at least one substantially horizontal support pivot, at least one substantially vertical tire support axle affixed to the substantially horizontal support pivot near a first end and near a second end the tire support axle is interconnected to at least one wheel, at least one latch which retains each of the at least two pivoting wheel assemblies to the base in a first operative position, and the latch is interconnected at least partly to each vertical tire support axle, and a spring is mounted at least partly to the vertical tire support axle, which spring biasing urges each pivoting wheel assembly and at least one latch of each pivoting wheel assembly into releasable retention to the base by at least one male-female connection, and;

the at least two wheel assemblies are movable from the first, operative position wherein the wheel assemblies provide rolling support to the carrier device and a second, inoperative position wherein the latch of each pivoting wheel assembly is released from the male-female connection, and the wheel assemblies and their at least one associated wheel are folded so as to overlie the base and are situated substantially within the perimeter and side elevational profile of the carrier and wherein manual pivoting movement of each of the at least two wheel assemblies from the stowed position to the operative position alignment, depresses the spring of the spring biased wheel assembly latch, thereby latching the wheel assembly in the operative position by male-female connection between the wheel assembly latch and the base.

7. A wheeled carrier device in accordance with claim 6, wherein said plurality of foldable walls are supported on said base and movable between a first operative, erected position wherein said walls define a carrier space and a second, stowed collapsed state wherein the walls are folded on top of said base, and are retained in their stowed status by the at least two stowed wheel assemblies.

8. A wheeled carrier device in accordance with claim 6, wherein the wheel assembly includes at least one shaped portion providing a finger grip, and manual movement of the finger grip releases the male-female connection between each of the at least two pivoting wheel assemblies and the carrier base.

9. A wheeled carrier in accordance with claim 6, which includes a hanging rack with a first, operative position where the rack is elevated and hung between a pair of vertical uprights wall portions of the carrier when the vertical upright wall portions are in their operative position, and in a second, stowed position the rack is stowed along the base of the carrier.

10. A wheeled carrier device in accordance with claim 7, wherein at least one of the foldable upright walls is retained in the first, operative position by at least one male female connection between the foldable upright wall and the base, and a manually releasable latch is mounted to the base which latch, in a first, operative latch position prevents movement of the foldable upright wall to the second, stowed position by preventing release of the male female connection, and the latch is manipulable to a second, inoperative latch position which permits disconnection of the said male female connection, and movement of the upright wall to the said stowed position.

11. A wheeled carrier device in accordance with claim 6, wherein the device includes a handle with an elongate portion, and the handle is pivotably mounted to the carrier base by a pivot, and in near proximity to the handle mounting pivot is a vertical slot formed out of at least one wall of the carrier base, and the elongate handle portion, when in the operative position, partially occupies the vertical slot, and a keeper latch is mounted along said wall, and the keeper latch in a first, operative position is moved to a position at least partly in contact with the handle, and retains part of the elongate handle portion angularly disposed upwardly in relation to the carrier base, and in a stowed position of the keeper latch, the latch is moved to a position that permits the handle to occupy a handle stowed position parallel with the floor.

12. A wheeled carrier device in accordance with claim 6, wherein a spring biasing means act between the horizontal support pivot and a base surface, and when at least one wheel assembly latch is released from the releasable engagement status of the first position, the spring biasing causes the wheel assembly to be swept through an angle to the second, stowed position.

13. A wheeled carrier device in accordance with claim 6, wherein the latch includes at least one shaped portion providing a finger grip, and manual movement of the at least one latch finger grip releases the male-female connection between each of the at least two pivoting wheel assemblies and carrier base.

14. A wheeled carrier device in accordance with claim 6, wherein at least one surface of each of the at least two pivoting wheel assemblies includes an access area, and at least one latch is recessed at least partly within the wheel assembly periphery and includes at least one shaped portion providing a finger grip, and also includes a face plate component, defining at least one latch connector connecting the latch to the face plate component and at least one retaining means connecting the face plate to a surface of the wheel assembly and also including at least one shaped face plate grip portion, and manual movement of the at least one face plate shaped finger grip portion releases the male-female latch connection between the wheel assembly and carrier base, at least in the said first, operative position.

15. A wheeled carrier device in accordance with claim 6, wherein a spring biasing means interact between the substantially horizontal support pivot of the wheel assembly, and at least one other carrier surface, and release of at least one wheel assembly latch from engagement status of the first position causes the wheel assembly to be swept through an angle to the stowed status of the second, stowed position.

16. A wheeled carrier device in accordance with claim 6, including a face plate component, defining at least one latch connector connecting the face plate to the latch, and at least one retaining means connecting the face plate to at least one surface of each of the at least two pivoting wheel assemblies and also including at least one shaped face plate grip portion, and manual movement of the at least one face plate shaped finger grip portion releases the male-female latch connection between the wheel assembly and the carrier base, at least in the said first, operative position.

17. A wheeled carrier device in accordance with claim 6, wherein manual movement of each of the at least two pivoting wheel assemblies, from the second, stowed position, to the first, operative position, positioning the wheel assembly in orthogonal and contiguous orientation to the carrier base in the first, operative position, provides the automatic engagement of the male-female connection between the latch and the carrier base.

18. A wheeled carrier device in accordance with claim 6, wherein a partial floor and a plurality of upright stub walls with free upper edges interlock together by male female connections between the floor and the upright stub wall components.

19. A wheeled carrier device in accordance with claim 6, wherein a spring biasing means of at least one wheel assembly to at least one other surface of the carrier causes the wheel assembly to be swept from the operative, to the stowed position, when the said latch of the wheel assembly is released from the first, operative position.

* * * * *